(12) United States Patent
Döhring (10) Patent No.: US 11,292,182 B2
(45) Date of Patent: Apr. 5, 2022

(54) PANEL HAVING DECORATIVE LAYER AND METHOD FOR PRINTING PANELS

(71) Applicant: Kronoplus Technical AG, Niederteufen (CH)

(72) Inventor: Dieter Döhring, Großenhain (DE)

(73) Assignee: Xylo Technologies AG, Niederteufen (CH)

(*) Notice: Subject to any disclaimer, the term of this patent is extended or adjusted under 35 U.S.C. 154(b) by 345 days.

(21) Appl. No.: 15/624,823

(22) Filed: Jun. 16, 2017

(65) Prior Publication Data

US 2017/0334128 A1  Nov. 23, 2017

Related U.S. Application Data

(62) Division of application No. 14/407,274, filed as application No. PCT/EP2012/061207 on Jun. 13, 2012, now Pat. No. 9,744,716.

(51) Int. Cl.
*B29C 59/14* (2006.01)
*E04F 15/10* (2006.01)
(Continued)

(52) U.S. Cl.
CPC ............ *B29C 59/14* (2013.01); *B41M 5/0011* (2013.01); *B41M 5/0047* (2013.01);
(Continued)

(58) Field of Classification Search
CPC ......... C09D 11/30; B05D 3/141; B05D 7/06; B05D 7/52; B29C 59/14; B29K 2033/20; B29L 2031/722; B41M 5/0011; B41M 5/0047; B41M 5/0064; B44C 5/04; B44C 5/0476; B44F 9/02; E04C 2/30; E04C 2002/005; E04F 15/02194; E04F 15/102;
(Continued)

(56) References Cited

U.S. PATENT DOCUMENTS 2,035,761 A  3/1936  Reese
4,581,255 A  4/1986  Coggan
(Continued)

FOREIGN PATENT DOCUMENTS

CN  101032891 A  9/2007
DE  10 2004 032058 A1  5/2005
(Continued)

OTHER PUBLICATIONS

Ebecryl 284 data sheet. Allnex. (Year: 2018).*
(Continued)

*Primary Examiner* — Sathavaram I Reddy
(74) *Attorney, Agent, or Firm* — Renner, Otto, Boisselle & Sklar, LLP (57) ABSTRACT

A printed image for the decor of a panel and a method for imprinting plates, in particular wall, ceiling or floor panels. The method includes the following steps: (i) providing a plate; (ii) applying a primer by means of a liquid curtain of coating material on/to a main surface of the plate; (iii) optionally drying and/or curing the primer; (iv) treating the surface of the primer by means of at least one of the following measures: a) corona treatment; b) plasma treatment; c) applying an oil in an aqueous dilution and (v) applying a decorative decor.

3 Claims, 4 Drawing Sheets

(51) Int. Cl.
*B41M 5/00* (2006.01)
*E04F 15/02* (2006.01)
*B44C 5/04* (2006.01)
*B44F 9/02* (2006.01)
*E04C 2/30* (2006.01)
*E04F 15/20* (2006.01)
*B05D 3/14* (2006.01)
*B05D 7/06* (2006.01)
*B05D 7/00* (2006.01)
*B29K 33/20* (2006.01)
*B29L 31/00* (2006.01)
*E04C 2/00* (2006.01)

(52) U.S. Cl.
CPC ............. *B41M 5/0064* (2013.01); *B44C 5/04* (2013.01); *B44C 5/0476* (2013.01); *B44F 9/02* (2013.01); *E04C 2/30* (2013.01); *E04F 15/02194* (2013.01); *E04F 15/105* (2013.01); *E04F 15/107* (2013.01); *B05D 3/141* (2013.01); *B05D 7/06* (2013.01); *B05D 7/52* (2013.01); *B29K 2033/20* (2013.01); *B29L 2031/722* (2013.01); *E04C 2002/005* (2013.01); *E04F 15/102* (2013.01); *E04F 15/206* (2013.01); *Y10T 428/24802* (2015.01)

(58) Field of Classification Search
CPC ..... E04F 15/105; E04F 15/107; E04F 15/206; Y10T 428/24802
See application file for complete search history.

(56) References Cited

U.S. PATENT DOCUMENTS

| | | | |
|---|---|---|---|
| 4,642,654 A * | 2/1987 | Toganoh | B41M 5/5218 347/105 |
| 6,565,919 B1 | 5/2003 | Hansson et al. | |
| 8,366,260 B2 | 2/2013 | Gauss et al. | |
| 8,865,267 B2 | 10/2014 | Döhring et al. | |
| 2002/0059762 A1* | 5/2002 | Takeuchi | B44C 5/04 52/311.1 |
| 2002/0061389 A1 | 5/2002 | Brooker | |
| 2004/0012647 A1* | 1/2004 | Sanger | H04N 1/407 347/14 |
| 2004/0146695 A1 | 7/2004 | Hardwick | |
| 2007/0104899 A1* | 5/2007 | Pearl | B41J 3/28 428/32.24 |
| 2007/0296795 A1 | 12/2007 | Dante | |
| 2011/0244200 A1* | 10/2011 | Van De Wall | B44C 5/0469 428/201 |

FOREIGN PATENT DOCUMENTS

| | | |
|---|---|---|
| DE | 10 2006 038750 A1 | 2/2008 |
| EP | 1170125 A2 | 1/2001 |
| EP | 2269744 A2 | 1/2011 |
| EP | 2308678 A1 | 4/2011 |
| RU | 2426604 C2 | 11/2007 |
| UA | 93446 C2 | 2/2011 |
| WO | 2008/061791 A1 | 5/2008 |

OTHER PUBLICATIONS

International Search Report and Written Opinion for corresponding Patent Application No. PCT/EP2012/061207 dated Mar. 27, 2013.
Office Action for corresponding Chinese Patent Application No. 201280074000.5 dated Sep. 5, 2016.
Decision to Grant for corresponding Patent Application No. AU 2015 00234 dated Nov. 16, 2015.

* cited by examiner

Fig. 1 (prior art)

Fig. 2 (Corona treatment)

Fig. 3 (plasma treatment)

Fig. 4 (canola oil)

PANEL HAVING DECORATIVE LAYER AND METHOD FOR PRINTING PANELS

This application is a divisional of U.S. patent application Ser. No. 14/407,274 filed Feb. 17, 2015, which is a U.S. National Phase Application of International Application No. PCT/EP2012/061207 filed Jun. 13, 2012, which are hereby incorporated herein by reference in their entirety.

1. FIELD OF THE INVENTION

The present invention relates to panels, in particular wall, ceiling or floor panels, which are provided with an imprinted decor, as well as a method for imprinting such panels or plates.

2. BACKGROUND OF THE INVENTION

From the prior art, a number of devices and methods are known for providing the surfaces of plate-shaped elements—herein referred to as plates or panels—with a decor. The provision of plates with decors is widespread, especially in the furniture industry and the manufacturing of flooring. For example, so-called laminate panels are known for floors, which are relatively inexpensive to manufacture and easy to work with. They are usually based on a carrier plate of a wood-based material, such as MDF or HDF, on which surface an imprinted decor paper impregnated with a resin has been applied. Over the decor paper, a so-called overlay paper is usually also applied, in order to improve the durability of the upper layer. The used papers are impregnated with resins, such as for example amino resins, which cure by compression under the influence of heat and pressure. In order to enhance the abrasion resistance of the surfaces the resins are also often provided with abrasion resistant particles, such as in particular corundum.

In a further development of such laminate panels so-called direct-imprinted panels have been developed. With these direct-imprinted panels, no papers are usually applied any longer, in particular no decor paper. The decor layer is printed rather by using emulsion paints by means of gravure printing directly on the surface of the panels or the plate. For this purpose, the surface is properly pretreated, in particular ground and provided with a proper primer, which is applied via rolls. After imprinting and drying of the decor layer, several polymer layers (based e.g. on polymerizable acrylate systems) are subsequently applied and cured. The resin layers serve as a protective layer and abrasion resistant surface, whereby also abrasion resistant particles are commonly embedded within.

From the WO 2008/061791 A1 of the same applicant, which content is hereby fully incorporated by reference, an improvement of the above mentioned polymer layers is known. The core of the improvement is that two different liquid polymer layers are applied wet on wet over one another on the surface of a panel, such that a partial mixing of the coating agent takes place at the interface. The two layers applied wet on wet are then cured jointly, whereby the resulting cured layer has a hardness gradient due to the partial mixing, whereby the hardness of the coating decreases with increasing depth as seen from the surface of the resulting coating.

From the DE 10 2004 009 160 B4 a method for manufacturing a floor panel is known, where an undercoating is applied on the surface of a plate by roll-coating, and subsequently thereon a primer also by roll-coating. Then the decor is imprinted thereon and subsequently a highly abrasion resistant as well as scratch resistant lacquer layer is applied. This document thus shows a typical method of the prior art.

From WO 2011/020755 A1 an improved method is known whereby a decorative pattern is applied by means of digital printing after rolling on a primer on the surface of a plate and drying the primer.

Although in particular the above mentioned WO 2008/061791 represents a significant advance in the prior art, there is still a need for improvement. It is therefore the object of the present invention to improve the known prior art and in particular to provide an imprinted panel, which has a particularly high quality print image, as well as a method for providing such an improved print image. In a further aspect, it is the object to provide a plate as well as a method, in which the adhesion of the various layers is increased, and therefore has particularly good values as to mechanical resistance.

These and other objects, which will be referred to more precisely when reading the following description, or may be recognized by the person skilled in the art, are achieved by a panel according to claim 1 and a method according to claim 4.

3. DETAILED DESCRIPTION OF THE INVENTION

An inventive panel comprises a carrier plate, which is provided with a decor layer. In particular, wood-based material boards, such as MDF (Medium density fiber-board) or HDF (High density fiber-board), particle boards, OSB-plates (oriented strand board), real wood boards or similar are preferred as carrier plate. The decor layer can comprise a decor paper, which is connected with the carrier plate, or can also be a decor, which was imprinted directly on the plate. It is essential that the decor is imprinted by means of a digital four-color printing and is formed of a plurality of color points, of which more than 90% have a size from 1000 $\mu m^2$ to 15000 $\mu m^2$, at a dpi value from 200-1200. The term dpi value is known to the person skilled in the art and denotes to the number of color points per inch (dots per inch). The dpi value applies at least in one direction (i.e. horizontal or vertical), however, it is preferred that the dpi value from 200 to 1200applies both in horizontal and vertical direction of the decor. It has surprisingly been found that the inventive choice of the area size of the color points during digital four-color printing leads to optically particular high quality decors. This is in particularly the case when the decor is an imitation of a real wood surface, to with a natural wood grain. It has been shown that a good imitation of real wood surface cannot be achieved when particularly small color points are selected, or when the color points exceed a certain size. With color points selected too large a high contrast and detailed image cannot be produced. With too small color points, again undesired optical defect phenomena arise in particular due to a certain resolution of the print image. This is unavoidable even with a higher dpi value at small color points, further, higher dpi values directly lead to higher costs for printing, since either multiple printing operations or elaborate printing systems are necessary.

With digital four-color printing usually the four basic colors cyan, magenta, yellow and black are used. Each color point of the print image is thereby formed by one of these four printing inks. From the four colors of four-color printing almost any desired color effect can be produced by varying the number of different color points on a surface. The single color points can still be distinguished with very high magnification microscopy. However, the single color points are not perceptible to the human eye, but rather an aerial color impression develops. This will be described in more detail below with reference to the figures.

Preferably, the color points have a size from 2000 µm² to 10000 µm², more preferably from 3000 µm²-8000 µm² and most preferably from 3500 µm²-5000 µm². At least 90% of the color points should preferably be in these size ranges. A dpi value from 280 to 1200 is generally preferred, and more preferably from 300 to 400. The dpi value should be given in at least one direction (i.e. horizontal or vertical), but preferably applies in both (vertical and horizontal) direction.

The present invention also relates to a method for imprinting plates, in particular wall, ceiling or floor panels. In a first step, a plate, such as the wood-based material boards described above, is provided. A primer is applied on the plate, after it has optionally been pre-treated, for example by applying a putty, grinding and applying an adhesive priming. The application of the primer is preferably done by means of a curtain coating method, i.e. by means of a liquid curtain of coating material through which the plate is directed. After an optional drying and/or curing of the primer and possibly other intermediate treatment steps, such as grinding or applying a priming, the surface of the primer is treated by means of at least one of the following measures: a corona treatment; a plasma treatment and/or most preferably by the application of an oil. After these treatment steps and optionally other drying steps a decorative decor is then imprinted on the plate.

The primer is preferably based on an aqueous dispersion (preferably an aqueous acrylate system) which has a suitable composition, such that it can be applied by means of a curtain coating method. In the prior art, the primer was usually applied with a roller coating method on the surface of the carrier layer. With such roller coating methods, the coating material (the primer) is directly provided from the roll on the surfaces to be coated or indirectly via a laminating tape, which is pressed by means of a press roll to the component to be coated. The inventors of the present application have found that surfaces, which have been produced in this way, do not reach the resolution and sharpness as actually to be expected, in particular in finely detailed printing images, as they are typically necessary for the imitation of real wood surfaces. In particular disturbing stripes occur in printed images with the use of polymerizable printing inks. The inventors have now surprisingly found that these problems can be avoided if a curtain coating method is used instead of a roll coating method. It is believed that the rolls of roll coating methods produce, due to their curvature, a minimal waviness of the surface in the coating to be transferred, being that the coating material is applied directly from the roll on the surface to be coated or indirectly via a laminating tape. The mountains and valleys of this undulating surface are so small that the surfaces prepared in this manner can be imprinted well with conventional gravure printing methods. However, it is believed that the very slight unevenness of such coated surfaces leads to a non-optimal print image with the use of digital printing, probably due to electric potential differences. In any case, the undesired formation of stripes can be effectively suppressed by the casting of the primer (by means of curtain coating), regardless of the printing method.

Curtain coating methods and corresponding system are known by the skilled person from the prior art (for example from EP 1 252 937 A1) so that a detailed description thereof may be omitted here. It is important that with curtain coating methods a liquid curtain of coating material is produced through which the components to be coated are guided. An application via rolls does not take place.

Preferably, a dispersion is used as coating material for the primer, and in particular an aqueous acrylate dispersion. Aqueous acrylate dispersions essentially consist of a solvent (namely water) and a binder in the form of plastic polymers (acrylate) which assemble when the solvent evaporates and form a solid continuous layer, as well as optional color pigments for generating the desired coverage and the desired basic color hue. The curing of these acrylate dispersions does not take place through a polymerization but through evaporation of the solvent, as the binder is already present as polymers. The polymers included in the dispersion link together during the evaporation in a purely physical manner and form a closed layer.

The inventors have surprisingly found that the print image of an imprinted decor can be improved if the primer is subjected to a special surface treatment after optional other intermediate processing steps. A suitable treatment of the surface is the so-called corona treatment. The corona treatment is an electrochemical method for surface modification of in particular plastics, and the basics of corona treatment are known from the prior art so that a detailed explanation is omitted here. It is merely important that with corona treatment one or more high voltage electrodes are used, which are arranged at a distance of a few millimeters to the surfaces to be treated. When the surface is carried by the high voltage electrodes, oxidation reactions take place at the surface, whereby usually the oxygen content of the air is used.

Alternatively, a plasma treatment of the surfaces can be performed. Also plasma processes for modifying surfaces are basically known from the prior art. A plasma treatment works for example by means of a plasma nozzle, in which an arc of light is generated via a discharge, by which a process gas is converted into the plasma state. The process gas, such as air, is directed through the tip of the nozzle onto the surface of the materials to be treated.

Although the intermediate treatment with corona discharge and plasma discharge is causing a significant improvement, the application of an oil, preferably in aqueous dilution, is particularly preferred. It has been found that by applying an oil particularly high quality print images can be produced without the need for instrumentally expensive plasma or corona treatment. It is believed that the fatty acids of the oil accumulate well to the polar groups of the base casting material and thereby lower the surface tension so that a suitable wetting of the ink droplets occurs on the surface. When using unsaturated fatty acids, the double bonds may start a chemical reaction after an optionally applied polymer coating and UV initiated polymerization, leading to particularly stable compounds of the various layers of the plate. Each oil can be considered as the oil, whereby the best results are achieved with natural oil, such as in particular linseed oil, palm oil, sunflower oil or canola oil. It has been found that in particular a high proportion of unsaturated fatty acids leads to particularly good results. Firstly, a high content of unsaturated fatty acids improves the optical impression of the printed image, on the other hand, unsaturated fatty acids lead to particularly well-adhering surfaces in connection with a later applied polymer layer. Generally preferred, the oil should thus have a high content by weight of unsaturated fatty acids in particular of at least 20%, preferably at least 30%, more preferably at least 50% and most preferably at least 80%.

Instead of the oil emulsion also other compounds can be applied which act in a similar manner and have a good effect on the printing result. One can thus obtain a similar result when rolling an aliphatic polyurethane acrylate in an amount of 1-20 gm/m$^2$, preferably 3-6 gm/m$^2$, onto the primer, digitally printing thereon and applying the further oligomer assembly as described. The polyurethane acrylate is clipped on the one hand via hydrogen bonds to the acrylate matrix of the primer and on the other hand via double bonds into the polymer network consisting of this polyurethane acrylate, the polymerizable printing inks and the subsequent oligomer layers.

It is apparent to those skilled in the art that the listed compounds are merely of exemplary nature. Generalizing for the found teaching, the following teaching applies: Particularly suitable for improving the print image are compounds which have three essential features: Functional groups, which can be anchored to the primer via secondary valence bonds; having an apolar backbone, which is adapted in polarity to the polarity of the printing ink, and double bonds, which are integrated into the polymer layer during the radiation-curing polymerization. However, these compounds must have at least two features: functional groups, which are anchored sufficiently via secondary valence bonds, and an apolar backbone which provides the proper polarity to match the printing ink.

Experimental tests have shown that the amount of applied oil per m$^2$ surface needs only to be little. Preferably, about 0.1-10 g oil/m$^2$ are applied, more preferably 1.0-5 g/m$^2$, more preferably 1.5-3 g m$^2$ and most preferably 1.6-2.5 g oil/m$^2$ of surface to be coated. The application of the desired amount of oil can be metered best when the oil is applied in aqueous dilution. The aqueous dilution should preferably be portioned such that it contains 1-30 parts of water per one part oil. Preferably, it contains 3-15 parts water per one part oil, more preferably 4-10 parts water per one part oil and most preferably 5-7 parts water per one part oil. This means for example that with a mixing ratio of 1 part oil per 8 parts water 8 grams water have to be mixed with one gram oil. When the oil is applied in aqueous dilution, preferably a drying step should be carried out prior to imprinting the surface, or a corresponding period of time should be waited before starting with the printing. The skilled person is aware that the evaporation or drying takes place very quickly, since only very little oil in aqueous dilution is applied per m$^2$ surface in absolute terms, i.e. the absolute amount is extremely small.

Generally preferred the decor is imprinted by means of digital printing and more preferably by means of digital four-color printing, as described above. In other words, the above information concerning average size of the color points, the dpi value and so on, can advantageously also be used with the inventive method.

Preferably, the panels or plates comprise above the decor layer or the decor a cured polymer layer as wear layer, which preferably comprises a hardness gradient according to the above mentioned WO 2008/061791. The polymer layer is preferably applied in form of a polymerizable acrylate system and comprises for example 1,6-hexandioldiacrylate, polyester acrylate, polyurethane acrylic-acid ester and diprophylline glycol diacrylate. Preferred thicknesses for the polymer layer (wear layer) are at 20-300 μm, more preferably at 40-250 μm, even more preferably at 50-220 μm and most preferably at 60-180 μm after curing. The curing of a polymer layer or of a polymerizable acrylate system is hereby to be understood as the chemical reaction taking place during the polymerization, such as in particular a polycondensation. This has to be distinguished from drying such layers, in which only the solvent such as the water content of the polymer layers evaporates or is reduced in a purely physical manner.

The application of the polymer layer takes place after imprinting the decorative decor on the surface of the plate or the panel. Optionally further method and processing steps can be performed after imprinting the decor, such as the application of a priming or the like. As already mentioned, it is generally preferred that the applied polymer layer (wear layer) preferably has a hardness gradient, so that the hardness of the polymer film decreases substantially continuously with increasing depth as seen from the surface of the polymer layer. In principle, such a hardness gradient can be set up by applying a first liquid coating agent (first oligomer) on the surface in a first step, and in second step at least a second liquid coating agent (second oligomer) on the first coating agent which is still wet. By applying wet on wet a partial mixing occurs at the interface. In a subsequent step the coating agent or the two applied coating agents are preferably cured jointly by means of radiation. For creating the hardness gradient, the two connected materials for the first and second layer should be different and should in particular comprise a different amount of C-C double bonds, so that a hardness gradient is created after curing due to the partial mixing. The technical details, however, are already known to the skilled person from the above mentioned WO 2008/061791, so that a detailed description is omitted here.

In an advantageous embodiment the used printing ink is based on a polymerizable acrylate. Usually, dispersion paints are used as printing ink (printing color) in the prior art, as in particular acrylic inks. These dispersion paints are regularly used with the typically applied gravure printing method. Dispersion paints are printing inks which are usually made up of three main components, namely (a) a solvent (nowadays usually water), (b) binder in the form of plastic polymers (acrylates), which assemble and form a solid layer when the solvent evaporates, as well as (c) color pigments to produce the desired coverage and the desired color hue. The drying of the dispersion paints does not take place via polymerization, but via volatilization or evaporation of the solvent, since the binder is itself already present as polymers. The polymers contained in the dispersion interconnect during liquefaction of the binder on a purely physical manner and thus form a closed layer.

The applicants have now surprisingly found that improved adhesive properties of the layer system can be achieved if not the common dispersion paints are used, but instead polymerizable printing inks are used. This is in particular advantageous for the preferred application with a polymer layer, in particular with hardness gradient, as will be explained in the following. The positive effect is particularly pronounced when the printing ink of the decor layer (when the decor layer is directly applied, such as in digital printing, the decor layer consists virtually of the printing ink) and the polymer layer(s) are cured or polymerized together. Due to the joint curing (polymerization/polycondensation) of the acrylate systems of printing ink and polymer layer a chemical cross linking takes place at the interface of both layers, of which it is assumed that it is responsible for the greatly improved adhesion of the layers. The conventionally used dispersion printing inks do not comprise polymerizable acrylate systems, so that no such chemical cross linking between printing ink and the polymer layer can take place. In particular, polymerizable acrylate systems are preferably used as polymerizable printing inks. Polymerizable printing inks contain as main components binder, namely resins containing reactive double bonds, that is monomers or oligomers, such as acrylate monomers and acrylate oligomers; optionally photo-initiators for radiation-curable printing inks, and in addition additives such as defoamers, flow additives, thickeners and color pigments in a small extent. It is generally preferred that the used polymerizable printing inks are radiation-curable, such as in particular printing inks curable by UV radiation (UV-curable) for the present invention. Therefore, in a particularly preferred embodiment of the invention, the preferred printing ink is a UV-curable polymerizable acrylate system.

Preferably, no UV-curable lacquer should be used as a coating agent for the primer. Experience has shown that in particular with the use of oils for surface treatment of the primer the adhesion of such lacquers may be deteriorated.

In the following, the inventive method will be explained in form of a non-limiting example.

As a plate a HDF carrier plate with a thickness of 8 mm is first provided with a priming based on a commercial aqueous acrylate dispersion via a roll applicator.

The plate is then smoothed by means of a putty. After pre-drying a primer is applied via a curtain coating method. The primer is based on an aqueous acrylate dispersion mixed with fillers and color pigments. After each of these coating steps an intermediate drying at temperatures between 80 and 200° C. takes place. On the primer a linseed oil is applied in eightfold-aqueous dilution via a roll applicator. The application rate is adjusted such that about 2 g (pure linseed oil) is applied per m$^2$ surface. Afterwards, a decor image is imprinted by means of a digital printer. For this purpose UV-rays-curable digital printing inks are used, wherein an ink amount of about 2 g/m$^2$ are required. Subsequently a polymer layer is applied in form of a double bonding containing oligomer which is provided with photo initiators and is ray-curable. On this wet polymer layer a second polymer layer of a double bonding containing oligomer, which is provided with photo initiators and is ray-curable, is applied, such that both layers partially mix at their interfaces. Then all three layers, i.e. the polymerizable printing ink, the first polymer layer and the second polymer layer are polymerized together by means of UV radiation, that is they are cured. The so-finished coated plate can then, in further processes, be divided into panels, which can be provided with known coupling elements so that multiple panels can be combined to form a floor.

Due to the joint curing of the polymer layers and the polymerizable printing ink a chemical bonding forms between the printing ink and polymer layers (wear layers) also when including the double bonds of the fatty acids of the applied oil which, as believed by the inventor, causes the particularly good mechanical strength values of the thus coated panels or plates. In the prior art, the adhesion took place substantially only through physical processes, since no joint curing, i.e. polymerization between the printing ink and the applied polymer layers, took place.

4. DESCRIPTION OF PREFERRED EMBODIMENTS

In the following the present invention will be described in more detail with reference to the attached figures.

Figure 1:
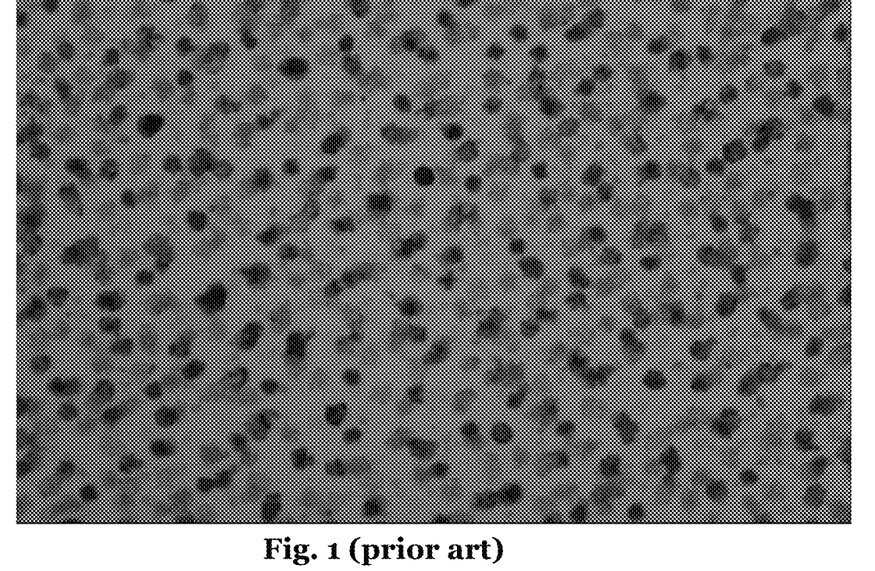
FIG. 1 is a microscope image of a printed image according to the prior art.

In FIGS. 1 to 4 different microscopic magnifications of four-color digital printing images are shown. The magnifications are taken from the printed image of a real wood decor. As can be seen from the figures, the decor is formed of a plurality of color points. It can be seen in the microscopic magnifications that the color points are discrete separate points. This cannot be distinguished by the naked eye without magnification. The FIGS. 1 to 4 are black/white, however it can basically be recognized that the size and the shape of the single color points vary in the figures. In FIG. 1, a four-color digital printing image according to the prior art is shown. The digital print was applied immediately after application of the primer. The single color points are clearly distinguished from each other, as this is actually desired with this printing technique. In fact, the printing image shown in FIG. 1 according to the prior art is technically very sophisticated. However, it has been found in practice that in particular with the imitation of real wood decors this well separated and technically sophisticated printed image is not optimally suited to mimic a natural wood surface. The inventors of the present invention have found that printed images being of high quality to the human eye can be created if the surface is pretreated prior to the imprinting with one of the following measures. Corona treatment; plasma treatment and most preferably applying an oil, preferably in an aqueous emulsion.

Figure 2:
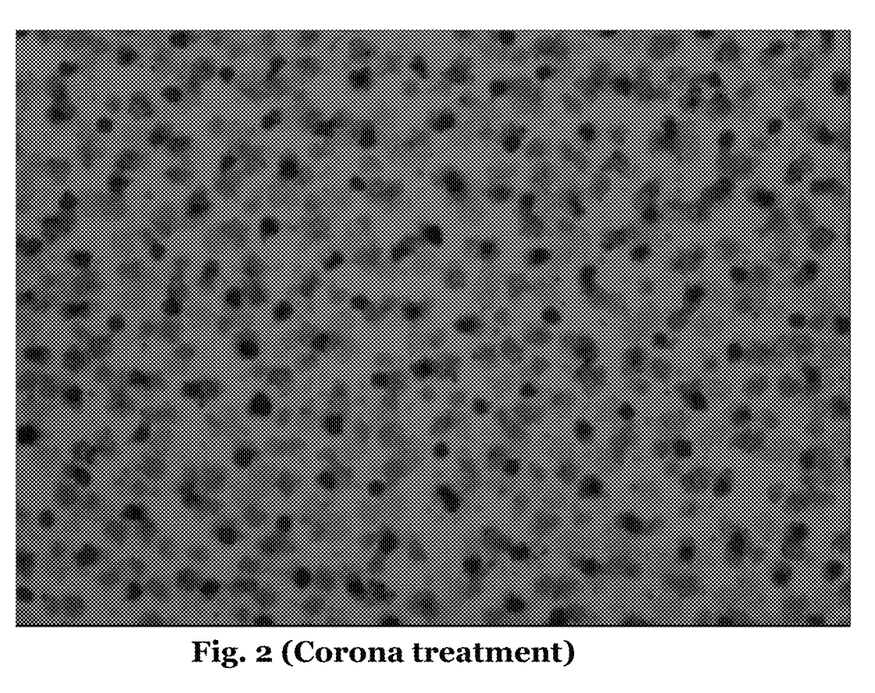
FIG. 2 is a microscope image of a printed image with preceding corona treatment.
Figure 3:
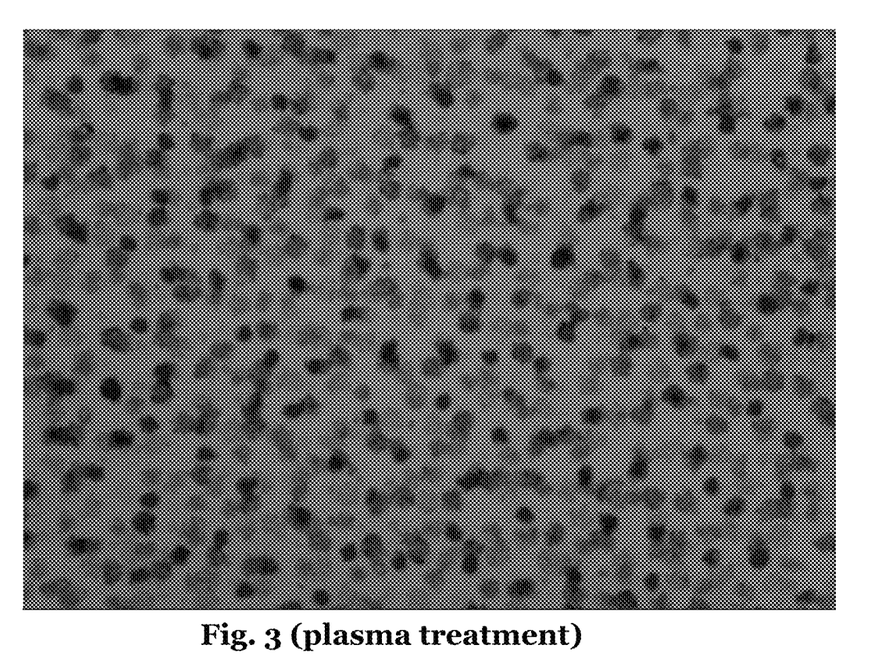
FIG. 3 is a microscope image of a printed image with a preceding plasma treatment.

In FIG. 2 a printed image with microscopic magnification is shown in which the primer was subjected to a corona treatment prior to printing. As can be seen from FIG. 2, the single color points are dissolved somewhat stronger and cover more of the total surface. Similarly good results can be achieved with a plasma treatment, as can be seen in FIG. 3.

Figure 4:
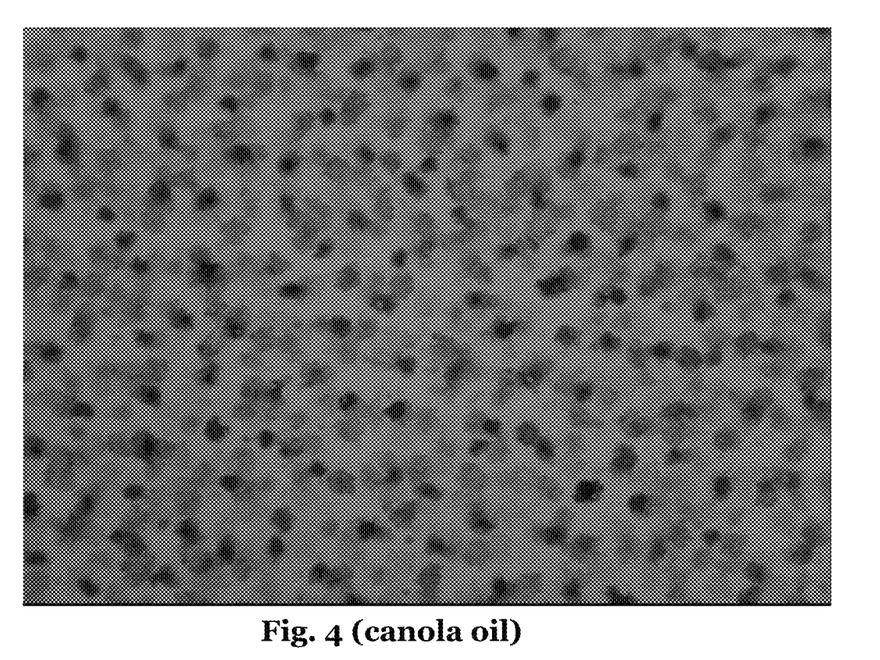
FIG. 4 is a microscope image of a printed image with preceding treatment with diluted canola oil.

However, the best results have been found when, after the application of the primer and a possible drying and/or curing of the primer, an oil is applied to the surface in aqueous emulsion. In the shown example, a canola oil was used, which was applied in a dilution with water with one part oil and 8 parts water.

Thereby, 2 g oil per m$^2$ was applied (i.e. about 18 g/m$^2$ of the aqueous oil water dilution). The single color points of the digital four-color printing are strongly dissolved and offer a good coverage of the base layer, as it is shown in the microscopic magnification of FIG. 4. Although such a flow is usually not desirable, it has surprisingly been found that such a printing image makes a particularly very high quality impression to the human eye, especially in the representation of a real wood decor. As can be seen from the figures, the color points are not all of the same size. With the printed image shown in FIG. 4, most of the color points are thereby in a size range from 2000 µm$^2$ to 3500 µm$^2$. In addition, about 360 color points per inch (360 dpi) are in horizontal direction. A similar value is obtained for the vertical alignment in which also about 360 color points per inch are counted (360 dpi).

Figure 5:
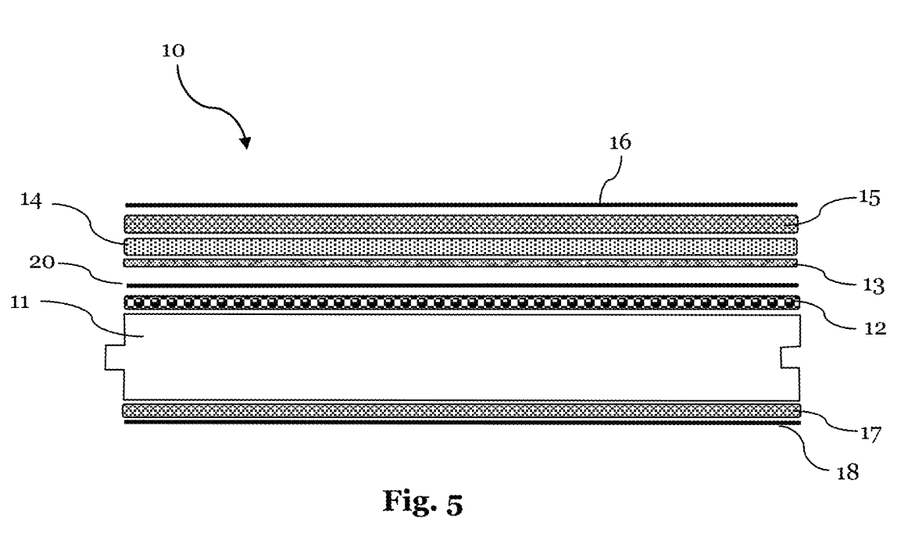
FIG. 5 shows an exemplary layer structure.

In FIG. 5, a schematic layer structure of a panel or a plate according to the invention is shown. The illustration is purely schematic and not to scale. In particular, the actual carrier plate 11 is considerably thicker than the other layers 12-16, which are in the range of a few micrometers. The shown carrier plate 11 is a HDF plate with a thickness of about 8 mm. A sound insulation layer 17 as well as a moisture protection layer 18 attached thereto is located on the bottom side of the carrier plate 11. On the upper side, i.e. a main surface of the plate, the primer 12 is applied. On the primer 12 a decor layer or a decor 13 is provided. The decor was applied by means of a polymerizable printing ink with digital four-color printing. Two polymer layers are located over the decor layer 13, which constitute the actual wear surface of the panel 10. The polymer layers 14 and 15 are based on a acrylate system and have a hardness gradient. To increase the abrasion resistance of the surface, abrasion resistant particles, in particular corundum can be added to the polymer layers, as known by the person skilled in the art. A top lacquer layer 16 is located as the topmost surface. Between the single layers, in particular between the surface of plate 11 and the primer layer 12, other layers may be provided, such as in particular priming to improve adhesion. According to the invention, an oil in aqueous emulsion was applied to the primer 12, and forms an oil layer 20.

Figure 6:
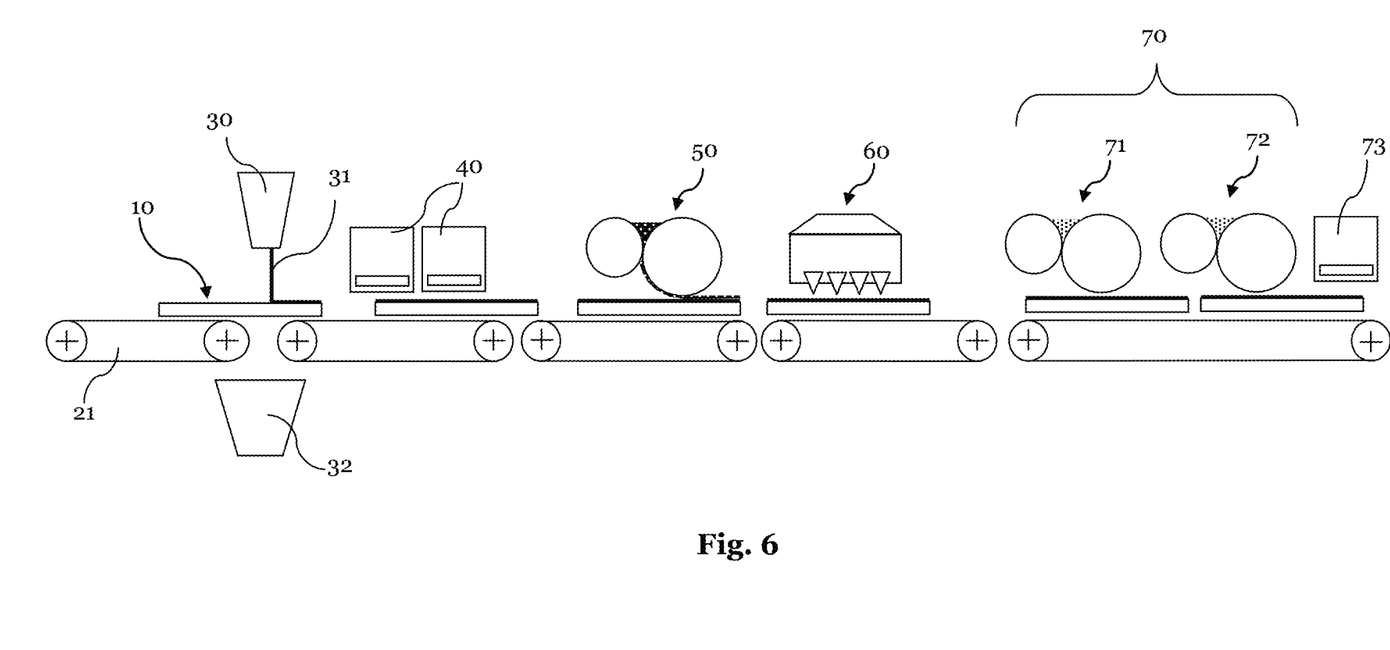
FIG. 6 shows a system for carrying out the inventive method in a schematic view.

In the following, the inventive method will be described with reference to FIG. 6. FIG. 6 shows schematically a coating system for coating plates or panels 10. The plates 10, which can be for example solid wood plates, MDF, HDF or particle boards, are guided via a roller conveying system 21 through the various stations of the coating system. The illustrated coating stations are not intended to be exhaustive, but merely serve as an example to illustrate the inventive method. Before, after and between the shown stations further processing stations may be provided, such as for example other drying stations, stations for applying priming, stations for applying putty and so on. In the first illustrated station 30, the primer is applied by means of a liquid curtain 31 of coating material onto the main surface of plate 10. The liquid curtain 31 extends over the entire width of the plate and the plates are transported through this curtain and are thereby coated. Beneath the devise 30 to output the curtain, a collection container 32 is provided, into which the liquid curtain is falling when no plate is guided through the curtain, such as for example in the gap between two consecutive plates. As coating material for the primer an aqueous acrylate dispersion is preferably used. In one of the subsequent drying station 40 the applied primer is dried with hot air, i.e. water is withdrawn from the acrylate dispersion. In station 50, an oil in aqueous dilution is applied to the primer by means of rollers. The oil is preferably a natural oil, such as linseed oil, palm oil, sunflower oil or canola oil and is applied in an amount of 1-5 g oil/m$^2$.

In station 60 a decorative decor, such as in particular a real wood decor is applied by means of a digital printing to the treated primer. Optionally, a drying step can be provided between the stations 50 and 60. After the printing, a polymer layer is applied in the treatment station 70. The polymer layer is applied with a hardness gradient, such that the hardness of the polymer layer increases substantially continuously with increasing depth as seen from the surface of the polymer layer. For this purpose, a first polymer layer based on a polymerizable acrylate system is applied in a first coating unit 71. Onto this polymer layer, a further polymer layer is applied wet on wet in station 72. The second polymer layer has exemplarily a higher content of double bonds, as described in detail in the aforementioned application for hardness gradient. The two polymer layers are applied in the stations 71 and 72 wet in wet such that a partial mixing takes place at the interface of the two layers. In station 73, the two polymer layers are cured jointly under exposure to UV radiation.

Preferably, station 60 is a digital printing station and uses a printing ink based on a polymerizable acrylate. In this case, it is preferred that between stations 60 and 70, no curing of the printing ink takes place, but at best an intermediate drying step at which step some moisture is removed from the polymerizable acrylate of the printing ink. In the curing station 73, the printing ink and the first and second polymer layers are then cured together, resulting in a highly resistant surface.

In FIG. 6 the application of an oil in aqueous dilution is provided with the coating station 50. Alternatively, or additionally, however, also stations for corona treatment or plasma treatment can be provided here. For example, a further station for corona treatment can be provided between station 40 and 50 and the application of an oil in aqueous dilution takes place after the corona treatment in station 50.

The invention claimed is:

1. A panel, wherein the panel is a wall, ceiling or floor panel, comprising:
    a carrier plate provided on at least a main surface with a decor layer, wherein the decor layer has a decor that is an imitation of a real wood surface and imprinted by digital four-color printing, wherein the decor layer is provided on a primer layer that was applied by curtain coating, wherein
    an aliphatic polyurethane acrylate is provided in an amount of 1 to 20 g/m$^2$ prior to printing onto the primer layer, and wherein
    the décor is formed of a plurality of color points, of which more than 90% have a size from 3500 µm$^2$ to 5000 µm$^2$, at a dpi value from 200 to 1200.

2. The panel according to claim 1, wherein the dpi value is from 280 to 1200.

3. The panel according to claim 1, wherein the dpi value is from 300 to 400.

\* \* \* \* \*